(12) United States Patent
Okanoue

(10) Patent No.: US 9,935,480 B2
(45) Date of Patent: Apr. 3, 2018

(54) POWER SWITCH DEVICE AND SYSTEM USING SAME

(71) Applicant: Mitsubishi Electric Corporation, Tokyo (JP)

(72) Inventor: Takahiro Okanoue, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 65 days.

(21) Appl. No.: 15/100,858

(22) PCT Filed: Apr. 29, 2014

(86) PCT No.: PCT/JP2014/061923
§ 371 (c)(1),
(2) Date: Jun. 1, 2016

(87) PCT Pub. No.: WO2015/166547
PCT Pub. Date: Nov. 5, 2015

(65) Prior Publication Data
US 2016/0301235 A1    Oct. 13, 2016

(51) Int. Cl.
*H02J 7/06* (2006.01)
*H02J 7/00* (2006.01)
(Continued)

(52) U.S. Cl.
CPC ......... *H02J 7/0081* (2013.01); *B60L 11/1811* (2013.01); *H02H 11/003* (2013.01); *H02J 7/0068* (2013.01); *H02J 7/345* (2013.01)

(58) Field of Classification Search
CPC .... H02J 7/0068; H02J 7/0081; B60L 11/1811
(Continued)

(56) References Cited

U.S. PATENT DOCUMENTS

2002/0198648 A1* 12/2002 Gilbreth .............. F16H 61/0437
701/51
2003/0179034 A1    9/2003 Melis et al.
(Continued)

FOREIGN PATENT DOCUMENTS

EP    1349255 A2    10/2003
EP    2400649 A1    12/2011
(Continued)

OTHER PUBLICATIONS

International Search Report for PCT/JP2014/061923 dated Jul. 22, 2014 [PCT/ISA/210].
(Continued)

*Primary Examiner* — Edward Tso
*Assistant Examiner* — Aaron Piggush
(74) *Attorney, Agent, or Firm* — Sughrue Mion, PLLC; Richard C. Turner

(57) ABSTRACT

A power switch device provides and cuts off power supply to a load in which a MOSFET for causing a direct current power source to be connected and disconnected is provided between power supply lines and the direct current power source, located upstream of the power supply lines, the power supply lines including a ripple capacitor for stabilizing the supply voltage against fluctuations in the load current in the load, powered by the direct current power source. The power switch device is operated to transition power supply from opening to closing by gradually increasing the output voltage of the MOSFET to minimize the value of current charging the ripple capacitor.

6 Claims, 12 Drawing Sheets

(51) Int. Cl.
  *B60L 11/18*  (2006.01)
  *H02H 11/00*  (2006.01)
  *H02J 7/34*  (2006.01)

(58) Field of Classification Search
  USPC .............................. 320/129, 135, 163, 166
  See application file for complete search history.

(56) References Cited

U.S. PATENT DOCUMENTS

| | | | |
|---|---|---|---|
| 2011/0009171 A1 | 1/2011 | Watanabe et al. | |
| 2011/0221415 A1* | 9/2011 | Otsuka ................ | H02M 3/1588 323/283 |
| 2011/0316489 A1 | 12/2011 | Norimatsu et al. | |
| 2013/0342174 A1* | 12/2013 | Schlak .................. | H02H 9/002 320/166 |
| 2015/0155791 A1* | 6/2015 | Bao ........................ | H02M 7/17 363/17 |

FOREIGN PATENT DOCUMENTS

| | | |
|---|---|---|
| JP | 7-147767 A | 6/1995 |
| JP | 11-122813 A | 4/1999 |
| JP | 2004-135389 A | 4/2004 |
| JP | 2005-223804 A | 8/2005 |
| JP | 2010-49482 A | 3/2010 |
| JP | 2011-18195 A | 1/2011 |
| JP | 2014-30317 A | 2/2014 |
| WO | 2010150488 A1 | 12/2010 |

OTHER PUBLICATIONS

Communications dated Mar. 21, 2017 issued by the Japanese Patent Office in corresponding Application No. 2016-515792.
Communication dated Sep. 20, 2017, from the European Patent Office in counterpart EP application No. 14890692.8.

* cited by examiner

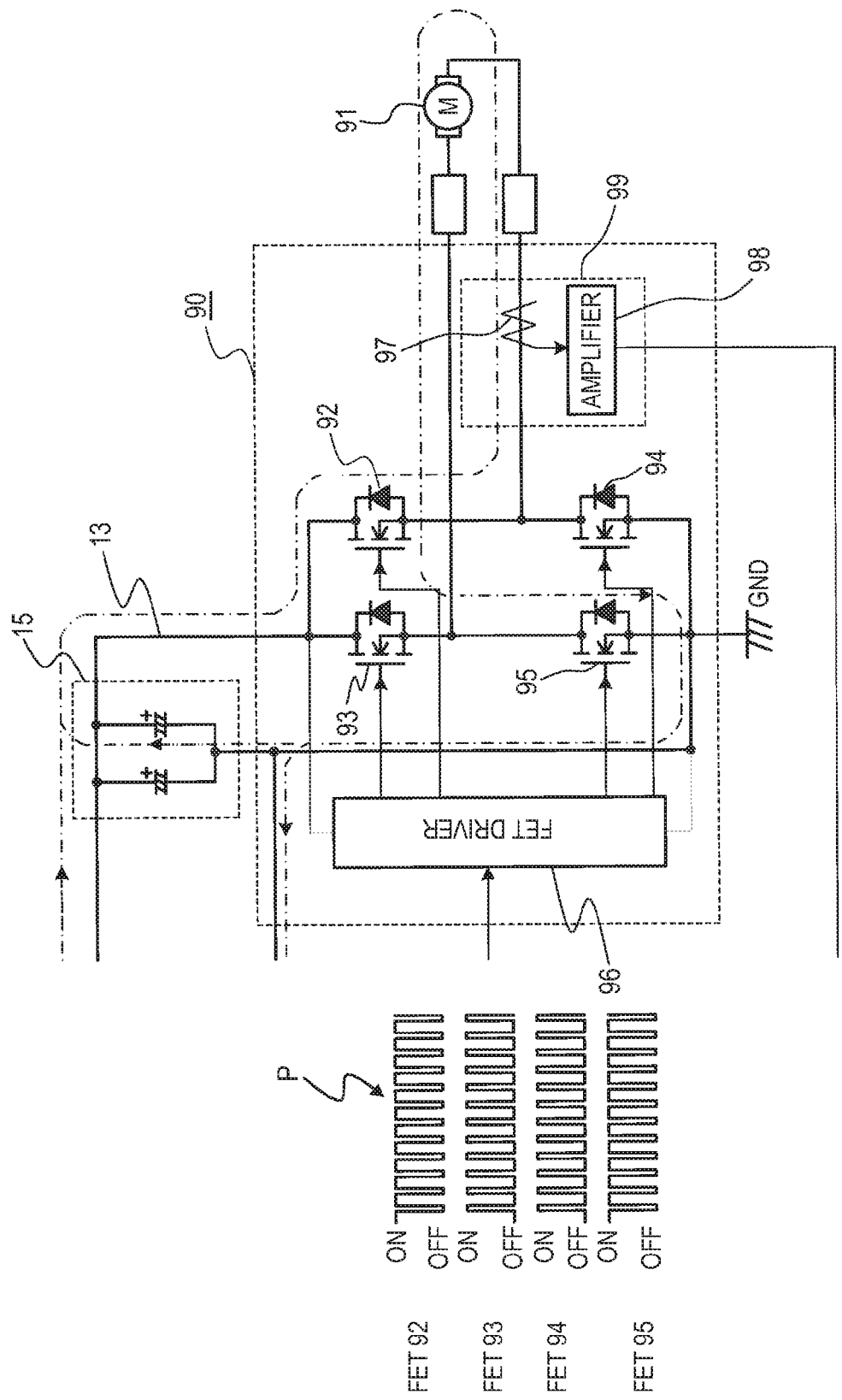

POWER SWITCH DEVICE AND SYSTEM USING SAME

CROSS REFERENCE TO RELATED APPLICATIONS

This application is a National Stage of International Application No. PCT/JP2014/061923, filed on Apr. 29, 2014, the contents of all of which are incorporated herein by reference in their entirety.

BACKGROUND OF THE INVENTION

Field of the Invention

The present invention relates to power switch devices, and particularly relates to a power switch device that is placed close to a functional circuit as a load and that opens and closes an electrical connection between a power supply line and a power source, the power supply line including a capacitor intended to stabilize the power supply voltage against fluctuations in the load current, and also relates to a system using the power switch device.

Description of the Related Art

This kind of power switch device is configured to, for example, in a PWM inverter circuit for driving a motor, switch between cutting off power supply in operation stop of a main circuit and providing power supply in operation of the main circuit.

In this example, when the PWM inverter circuit operates to appropriately control power provided from a power source by PWM switching and supply power necessary for driving the motor, current consumed by the PWM inverter circuit for its operation pulsates depending on the switching frequency and switching duty. This pulsating current is affected by parasitic inductance and wiring resistance due to wiring of the power supply circuit to cause pulsating voltage, which may cause disturbance in the voltage supplied to the PWM inverter circuit. As such, in order to stabilize the operation of a high-power load circuit such as the PWM inverter circuit, a provision of a capacitor having relatively large capacitance using an electrolytic capacitor or the like, what is called a ripple capacitor, is commonly and widely used in a power supply circuit with the intention to minimize fluctuations in the voltage supplied to the load circuit.

On the other hand, in starting the operation of a high-power load circuit such as the PWM inverter circuit, it is desirable in terms of stable operation to transition the power switch device from opening to closing before starting the operation of the load circuit, thereby establishing power supply to the load circuit and applying a rated voltage. In order to do so, the power switch device is operated to transition from opening to closing, then the procedure of starting the operation of the load circuit is performed.

Also, as a common technique, for example, a mechanical relay may be used for a power switch device. A solenoid included in the mechanical relay is driven to close the contact of a power supply line for powering a main circuit, thereby achieving transition from opening to closing in the power switch operation.

However, in the operation of closing the contact of the mechanical relay to power on, the voltage of the main circuit rapidly rises at the same time as closing of the relay contact, which causes inrush current in the ripple capacitor. The peak value of the inrush current is several times to several tens times higher than the maximum value of the normal consumption current of the operating PWM inverter circuit, which causes an instantaneous drop of power supply voltage. As a result, the operation of the large-current load circuit itself such as the PWM inverter circuit may be damaged, and furthermore, stability of the operation of other devices connected to the same power source may also be damaged.

At the same time, there is another concern that the very large inrush current flowing through the relay contact may accelerate roughening of the surface of the contact because of overheat of the contact due to exceeded allowable current value of the relay contact and occurrence of arc due to high contact voltage caused by mechanical bounce of the contact when the contact is closed.

In order to solve the problem as described above, a technique as disclosed in JP-A-2004-135389 (PTL 1) has been proposed, for example. In the technique as disclosed in PTL 1, in addition to a relay circuit that opens and closes an electrical connection between a power supply line and a power source, the power supply line including a capacitor for stabilized power supply (ripple capacitor) intended to stabilize the power supply voltage against fluctuations in a motor drive circuit (load), a precharge circuit including a first resistor and a second resistor having a resistance smaller than that of the first resistor is provided between the power source and the ripple capacitor.

Then, before the relay circuit is closed, the ripple capacitor is charged through the first resistor, then through the second resistor of the precharge circuit. As a result, a charging operation is performed on the ripple capacitor according to a time constant determined by the values of the ripple capacitor and the first or second resistor. Then, the contact potential difference when the relay circuit is closed is reduced, and the inrush current is mitigated.

[PTL 1] JP-A-2004-135389

As described above, when powered on in the configuration in which a power switch means is provided that is intended to be placed close to a functional circuit as a load and that is intended to open and close an electrical connection between a power supply line and a power source, the power supply line including a ripple capacitor intended to stabilize the power supply voltage against fluctuations in the load current, an occurrence of large transient inrush current due to the charging operation on the ripple capacitor cannot be avoided unless some measures are taken when the power switch means is transitioned from opening to closing.

So, as disclosed in PTL 1, a technique is generally used such that a precharge is performed to minimize inrush current. However, according to this technique, in order to fully utilize the precharge function, a precharge circuit, i.e., an auxiliary circuit needs to be added, which requires securement of circuit implementation space and additional cost.

Furthermore, since an additional starting sequence for performing the precharge becomes necessary, in order to perform a necessary and sufficient charging operation, the system starting time needs to be considered to include an extra time until the precharge completes.

In order to reduce the amount of time for the precharge to a practical extent, the current supply capability of the precharge circuit needs to be improved to be more appropriate for a balance between the capacitance of the capacitor and the allowable time until the system starts, which largely affects the implementation size and cost of the circuit.

Furthermore, in the technique disclosed in PTL 1, the first resistor and the second resistor having a resistance smaller than that of the first resistor are provided between the power source and the ripple capacitor to maintain the current supply capability appropriate for the capacitance of the capacitor and high-speed precharge operation is performed, however the precharge circuit is configured to use the two time constant differently, which increases the circuit size.

SUMMARY OF THE INVENTION

In order to solve the problem as described above, it is an object of the present invention to provide a small, compact and low-cost power switch device with a circuit size minimized as a whole, and a system using the power switch device.

In order to solve the above problem, the invention according to claim 1 is characterized by a power switch device for providing and cutting off power supply to a functional circuit in which a semiconductor switch means for causing a direct current power source to be connected and disconnected is provided between power supply lines and the direct current power source, located upstream of the power supply lines, the power supply lines including a capacitor for stabilizing the supply voltage against fluctuations in the load current in the functional circuit, powered by the direct current power source, wherein the power switch device is operated to transition power supply from opening to closing by gradually increasing the output voltage of the semiconductor switch to minimize the value of current charging the capacitor.

Furthermore, the invention according to claim 2 is characterized in that, for the operation of the power switch device for transitioning power supply from opening to closing, the increase rate of the output voltage of the semiconductor switch is configured to increase with time.

Furthermore, the invention according to claim 3 is characterized in that the semiconductor switch is configured using a bipolar transistor or a MOSFET.

Furthermore, the invention according to claim 4 is characterized in that a protection MOSFET for preventing current wraparound due to reverse connection of the power source is provided adjacent to the semiconductor switch.

Furthermore, the invention according to claim 5 is characterized in that the functional circuit is a PWM inverter circuit for driving a motor.

Furthermore, the invention according to claim 6 is characterized by a system including: a functional circuit powered by a direct current power source; a capacitor for stabilizing the supply voltage against fluctuations in the load current in the functional circuit; and the power switch device.

According to the power switch device according to claim 1, when power supply starts, the semiconductor switch means, which is a switch means of the power switch device, transitions to operating state by gradual increase in the output voltage. As a result, current in starting power supply charging the ripple capacitor provided on the load side of the power switch device is appropriately controlled depending on the gradually increasing gradient of the power supply voltage. This operation can minimize the rapid charging current (inrush current) to the ripple capacitor. This eliminates the need for a precharge circuit for precharging the ripple capacitor and can simplify the start sequence.

Furthermore, according to the power switch device according to claim 2, the operation of gradual increase in the output voltage of the power switch device is appropriately controlled within the rating of the semiconductor switch means to enable high-speed starting while achieving minimization of inrush current in starting power supply.

Furthermore, according to the power switch device according to claim 3, the power switch device can be provided in a simple configuration because a bipolar transistor or MOSFET that is generally easily available can be used as a semiconductor switch means.

Furthermore, according to the power switch device according to claim 4, a MOSFET for preventing current wraparound when the power source is connected in reverse polarity is provided adjacent to the semiconductor switch means, so, even when the power source is wrongly connected in reverse polarity, current wraparound to the load side can be prevented, and the protective characteristic against power source reverse connection functionally equivalent to a mechanical relay can also be achieved.

Furthermore, according to the power switch device according to claim 5, the rated current capacity of the semiconductor switch means and the capacitance of the ripple capacitor are determined so as to be generally proportional to the capacity of the power switch device, which allows the gradient of gradual increase in the output voltage can be set basically at a constant gradient whether the output is large or small. Accordingly, the rising time can be maintained constant whether the size of the applied power switch device is large or small, and the power switch device is widely applicable within its rating, and can be operated with the same starting sequence and generic design for various inverter circuit for motor drive having a variety of ratings.

Furthermore, according to the power switch device according to claim 6, current in starting power supply charging the ripple capacitor provided on the load side of the power switch device can be appropriately controlled depending on the gradually increasing gradient of the power supply voltage. This operation can minimize the rapid charging current (inrush current) to the ripple capacitor by simply providing the power switch device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10A is a diagram illustrating the operation of the system using the power switch device in accordance with the fifth embodiment of the invention.

DETAILED DESCRIPTION OF THE PREFERRED EMBODIMENTS

A preferred embodiment of a power switch device in accordance with the invention and a system using the power switch device is described below in detail with reference to the drawings.

First Embodiment

Figure 1:
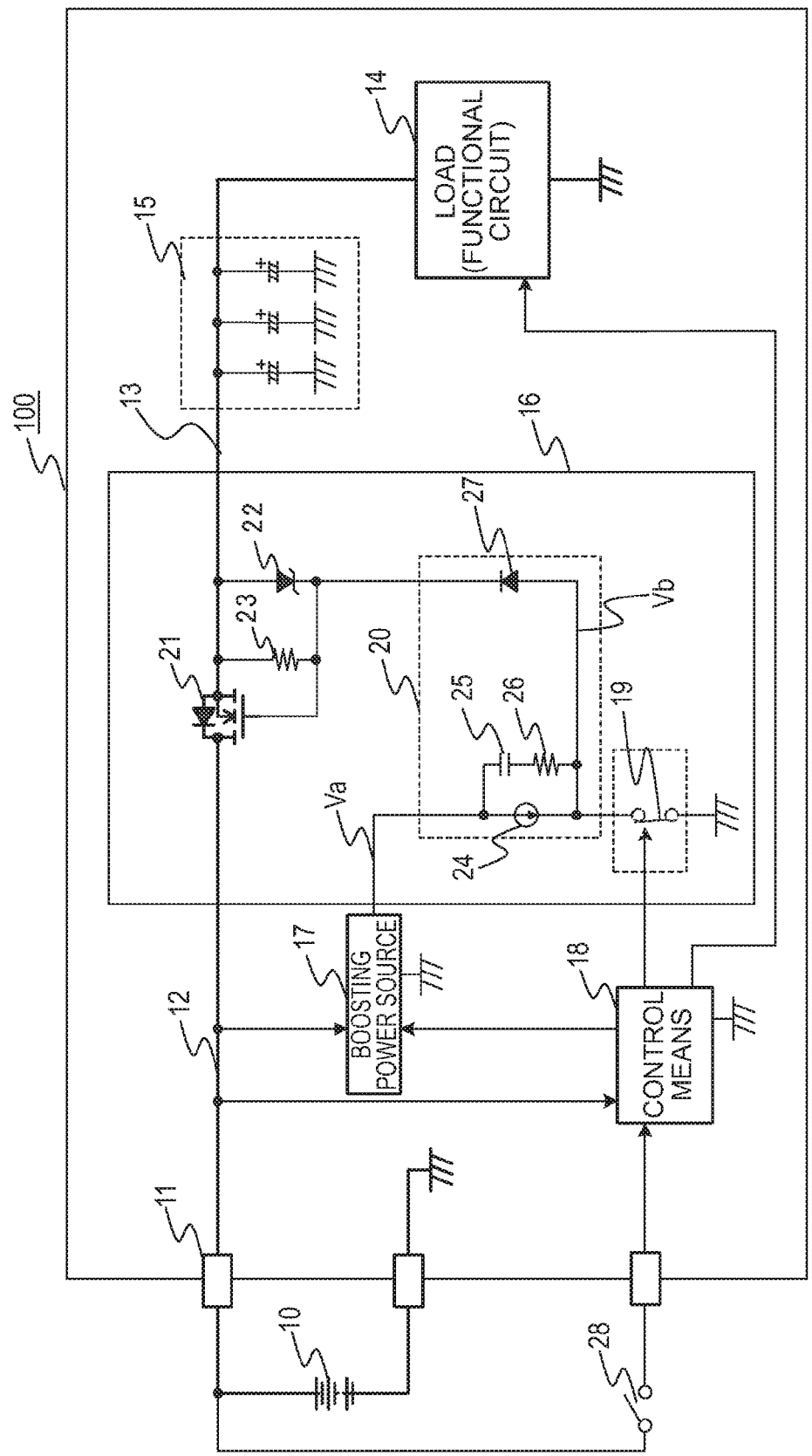
FIG. 1 is a diagram showing a connection example of a system using a power switch device in accordance with a first embodiment of the invention.
Figure 2:
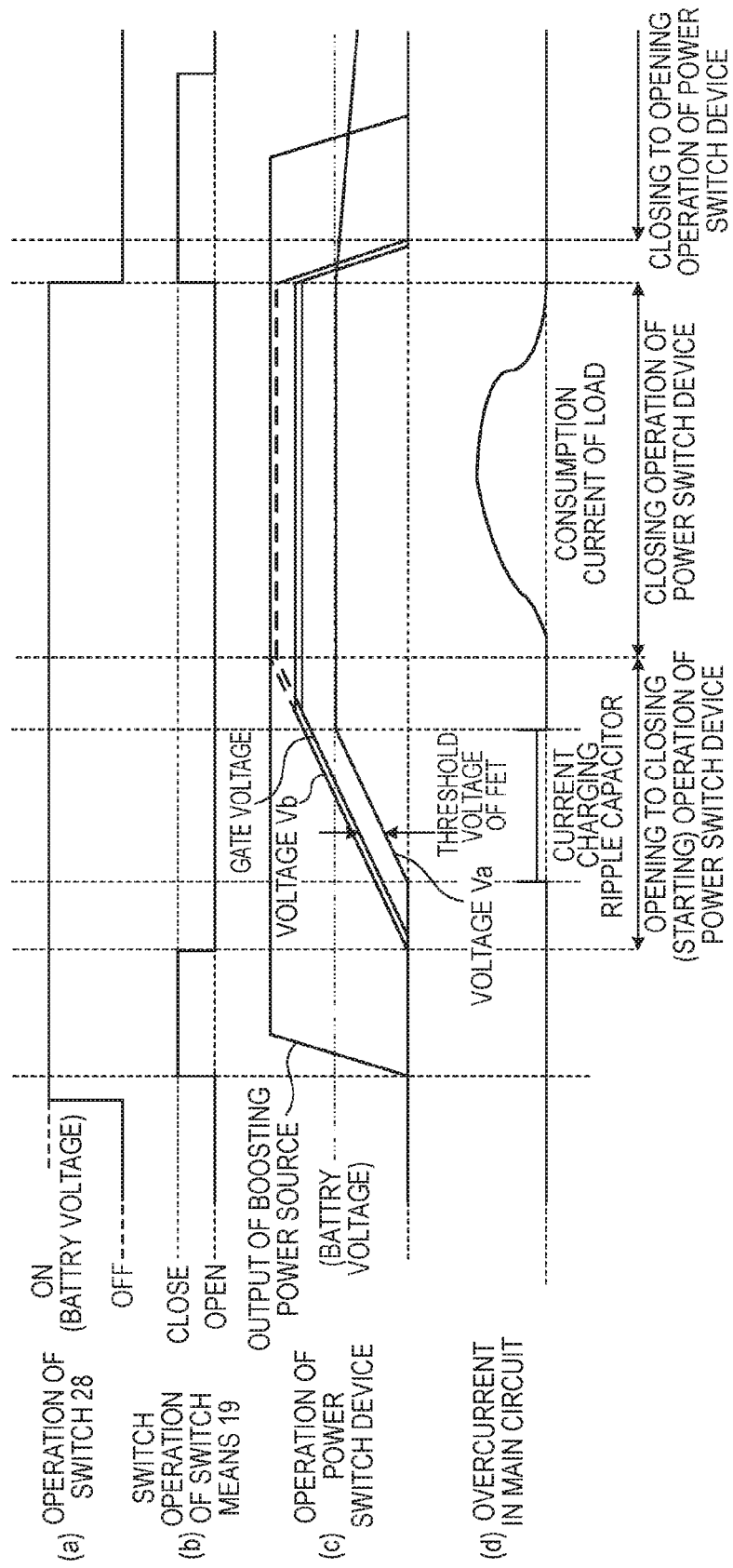
FIG. 2 is a diagram illustrating the operation of the system using the power switch device in accordance with the first embodiment of the invention.

FIG. 1 shows a connection example of a system using a power switch device in accordance with a first embodiment of the invention. FIG. 2 shows its operation waveform.

In FIG. 1, a reference numeral 100 denotes a system and direct current power supply is provided from a battery 10 through a connector 11 as a necessary power source for the operation of the system 100. A power supply line including main circuits 12, 13 of the system 100 has a functional circuit as a load (hereinafter referred to as a load) 14 connected thereto and a capacitor, i.e., ripple capacitor, 15 connected thereto to stabilize the voltage of the main circuits 12, 13 against fluctuations in the consumption current when the load 14 operates. In order to provide and cut off power supply to the load 14, a power switch device 16 is provided between the main circuit 12 and the main circuit 13. The opening and closing of the power switch device 16 and the operation of a boosting power source 17 necessary for the operation of the power switch device 16 are managed by a control means 18 using an operation of a microcontroller system or the like.

The power switch device 16 includes: a switch means 19 controlled by the control means 18; a ramp waveform generating means 20 that operates as described later; an enhancement type MOSFET 21 that is provided between the main circuit 12 and the main circuit 13 and operates as described later; a zener diode 22 connected between the gate and source of the MOSFET 21; and a resistor 23 connected in parallel with the zener diode 22.

The ramp waveform generating means 20 includes: a constant current source 24 connected between the boosting power source 17 and the switch means 19; a series connection of a capacitor 25 and a resistor 26 connected in parallel with the constant current source 24; and a diode 27 connected between the output side of the constant current source 24 and the zener diode 22. A switch 28 is connected to the battery 10.

Next, the operation of the system 100 when power supply is started is described with reference to FIGS. 1 and 2. In FIG. 2, (a) shows the operating state of the switch 28; (b) shows the operating state of the switch means 19; (c) shows the operating state of the power switch device 16; and (d) shows the current flowing in the main circuits 4, 5.

As shown in FIG. 2(a), when the switch 28 connected to the battery 10 is turned on, the control means 18 is started. When started, the control means 18 closes the switch means 19 provided in the power switch device 16 as an initial state as shown in FIG. 2(b), then causes the boosting power source 17 to start as shown in FIG. 2(c). The function of the boosting power source 17 is to obtain a higher voltage than the operational power supply voltage of the system 100 provided from the battery 10. This boosted voltage is provided to the ramp waveform generating means 20. At this point, a voltage held by the capacitor 25 included in the ramp waveform generating means 20 is the output voltage of the boosting power source 17 because the switch means 19 is closed as the initial state.

Next, in order to transition the operation of the power switch device 16 from opening to closing to provide power supply to the load 14, the control means 18 switches the operation of the switch means 19 provided in the power switch device 16 from closing to opening. As a result, as shown in FIG. 2(c), the output current of the constant current source 24 provided in the ramp waveform generating means 20 flows into the capacitor 25 because the switch means 19 opens, which reduces the voltage held across the capacitor 25 in a ramp shape.

If the output voltage Va of the boosting power source 17 is stable, the voltage Vb of the output side of the constant current source 24 consequently increases from 0V toward the voltage Va in a ramp shape. The voltage Vb is applied to the gate of the enhancement type MOSFET 21 through the diode 27. As a result of the Vb applied to the gate rising in a ramp shape, the MOSFET 21 gets into what is called source-follower operation, in which a voltage decreasingly offset by the gate threshold voltage of the MOSFET 21 from the voltage applied to the gate appears on the source side, i.e., on the connection of the main circuit 13. That is, the potential on the source side of the MOSFET 21 rises in a ramp shape.

As a result, the charge current i [A] is given by:

$$i = C \times \Delta V / \Delta t$$

where C[F] is the capacity of the ripple capacitor 15, and the voltage ramp of the main circuit 13 is $\Delta V[V]/\Delta t[s]$. So, the charge currents can be controlled by the gradient of the ramp.

As shown in FIG. 2(d), after a while, when the gate voltage of the MOSFET 21 sufficiently increases to cause the MOSFET 21 to be in a completely ON state, the rising operation of the power switch device 16 completes and a voltage almost equal to the voltage of the battery 10 is obtained at the connection of the main circuit 13. Then, the load 14 obtains power supply from the main circuit 13 in response to an instruction from the control means 18 to be operable in a predetermined manner. While the load 14 operates, even when fluctuations in the load current generate, it is possible to respond to instantaneous fluctuations in the current due to an effect of the ripple capacitor 15. At this point, the MOSFET 21 of the power switch device 16 is in ON state, so the current supply from the battery 10 is maintained.

Note that the zener diode 22 connected between the gate and source of the MOSFET 21 is provided for protection so that the voltage applied to the gate of the MOSFET 21 does not excessively increase to damage the gate of the MOSFET 21 after the rising of the power switch device 16. The zener voltage can be selected based on the gate voltage characteristic of the MOSFET 21. For the voltage applied to the gate of the MOSFET 21, a voltage output from the constant current source 24 and clamped by the zener diode 22 finally drives the gate of the MOSFET 21, which is a state during the normal closing operation of the power switch device 16, i.e., the normal operation of the system 100.

Next, the operation of the power switch device 16 in OFF state is described. As shown in FIG. 2(b), the control means 18 transitions the switch means 19 from opening to closing, which brings the voltage Vb to 0. As a result, the diode 27 cuts off and the charge remaining at the gate of the MOSFET 21 is discharged through the resistor 23, which turns off the MOSFET 21, i.e., causes the power switch device 16 to be in OFF state, as shown in FIG. 2(c). After the power switch device 16 is turned off, the charge in the ripple capacitor 15 is consumed by the leak path of the load 14 or the like and gradually discharged, however, may also be actively discharged, for example, through an additional bleeder resistor as needed.

As described above, according to the power switch device 16 in accordance with the first embodiment and the system 100 using the power switch device 16, when power supply starts, the MOSFET 21, which is a switch means of the power switch device 16, transitions to operational state as the output voltage gradually increases. As a result, current in starting power supply charging the ripple capacitor 15 provided on the load side of the power switch device 16 is appropriately controlled depending on the gradually increasing gradient of the power supply voltage. This operation can minimize the rapid charging current (inrush current) to the ripple capacitor 15, which is a problem for the prior art, by simply providing the power switch device 16, which eliminates the need for a precharge circuit for precharging the ripple capacitor 15 and can simplify the start sequence.

Second Embodiment

Next, a power switch device in accordance with a second embodiment of the invention and a system using the power switch device are described. For the operation of the MOSFET 21 for transitioning power supply from opening to closing described in the first embodiment, the increase rate of the output voltage of the MOSFET 21 may also be configured to increase with time.

According to the configuration of the first embodiment, when the system 100 starts, a predetermined voltage ramp is applied to the ripple capacitor 15, which is intended to minimize inrush current in the starting by causing a constant charging current to flow. However, the allowable value of the charging current is limited by the loss characteristic (area of safe operation) of the MOSFET 21 used as a power switch means.

Figure 3:
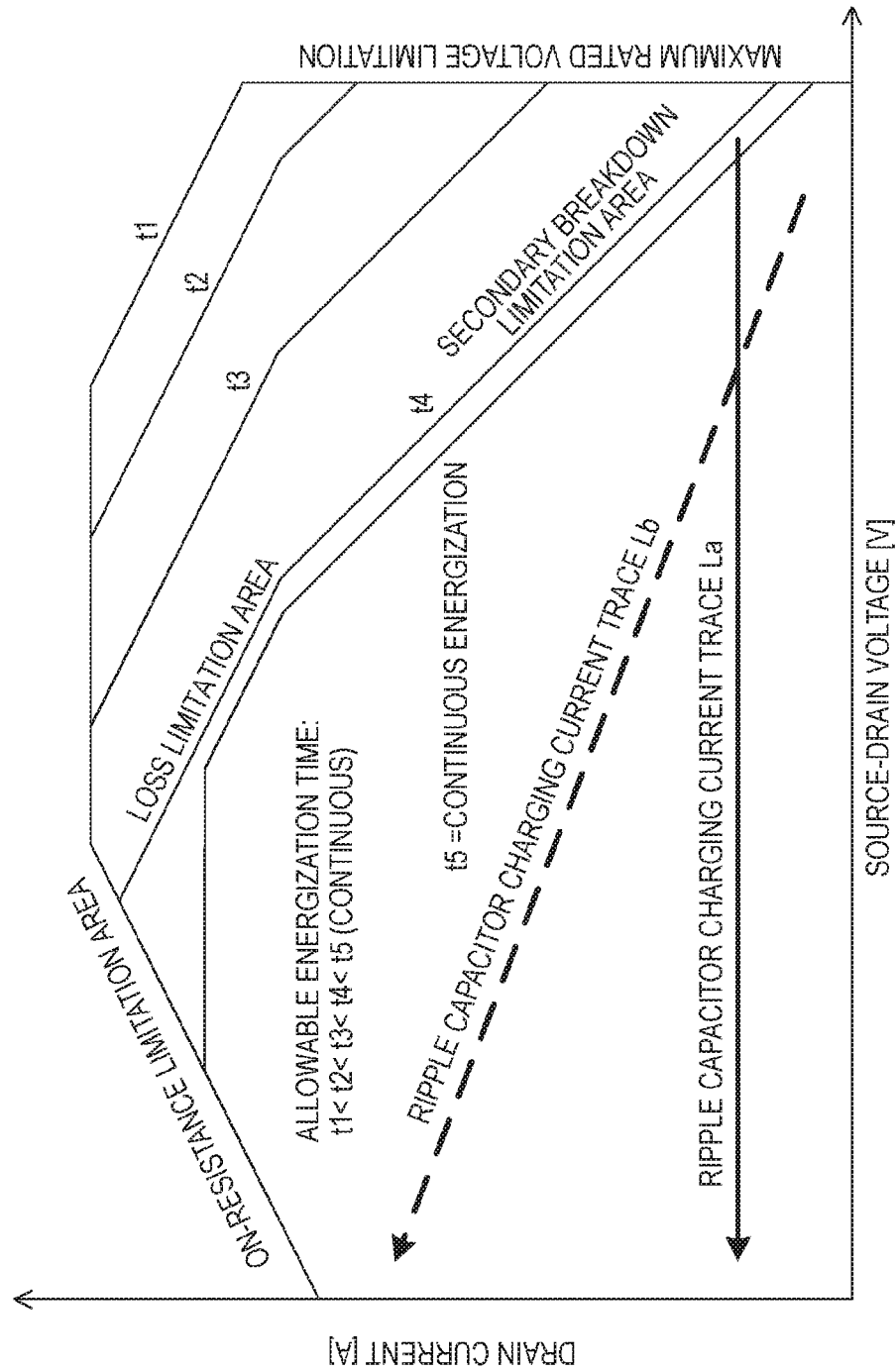
FIG. 3 is a diagram illustrating the area of safe operation of a semiconductor switch means for opening and closing power supply in the system using the power switch device in accordance with the first embodiment of the invention.

This situation is shown in FIG. 3. For example, when a MOSFET is used as a semiconductor switch means, the operable time of the device depends on the energizing current value, the drain-source voltage and the energization time, and the energizable area is limited. With a high drain-source voltage, in addition to a limitation due to withstand voltage of the device, a secondary breakdown limitation considering the damage due to malfunction of parasitic element in heat generation from the device, a limitation due to restriction of temperature increase of the device due to drain loss, and the like are taken into consideration to define an area of safe operation depending on time, ambient temperature, implementation condition and the like. When the ripple capacitor 15 is energized with a constant charging current using a rising in a ramp shape as in the first embodiment, the trace of the charging current would be like La in FIG. 3. That is, with some setting conditions of the charging current, the drain-source voltage is high in the beginning of the rising, so an operation in an area with a limited energization time may be required.

Thus, in order to improve this, the increase rate of the drain output voltage of the MOSFET can be configured to increase with time. As a result, the charging is performed along the trace like Lb in FIG. 3, in which there is a margin with respect to the rating of the FET in the beginning of the rising, and the charging is proceeded gradually, then, when the drain-source voltage becomes small, the charging current is increased, so the total charging time can be shortened while a margin is maintained in operating the FET.

Figure 4:
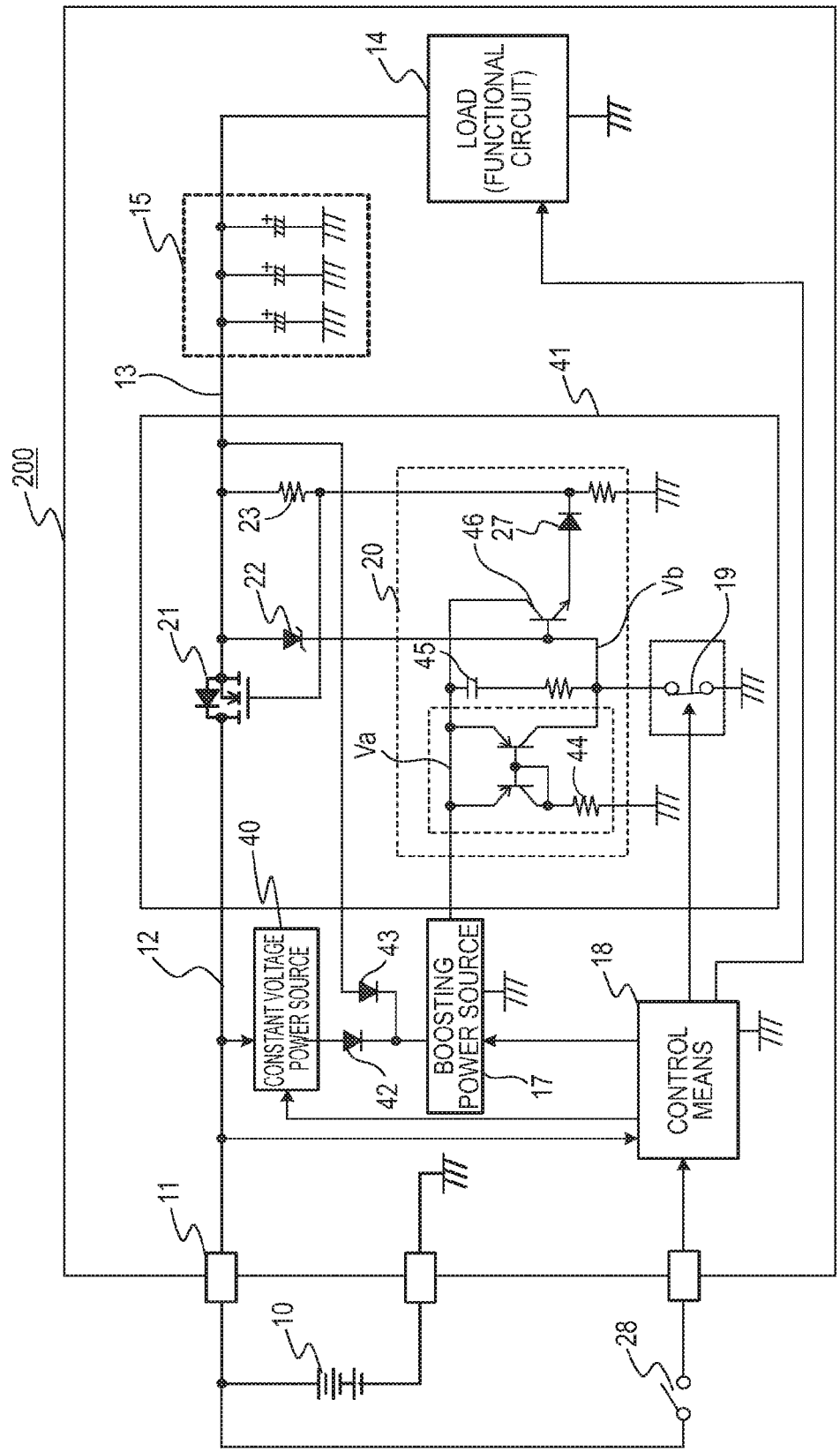
FIG. 4 is a diagram showing a connection example of a system using a power switch device in accordance with a second embodiment of the invention.

A configuration example of a system for achieving the above is shown in FIG. 4. FIG. 4 is a connection example of a system using the power switch device in accordance with the second embodiment of the invention. Note that a part that is the same as or corresponding to that of the first embodiment is denoted by the same reference numeral and is not described.

As a difference from the first embodiment, in a system 200, as an operational power supply for a boosting power source 17, a constant voltage power source 40 performing voltage drop operation of a battery power source 10 and a power supply provided from downstream of a MOSFET 21, which is a switch function of a power switch device 41, are switched by diodes 42 and 43, and a current mirror circuit is used as a configuration of a ramp waveform generating means 20.

Figure 5:
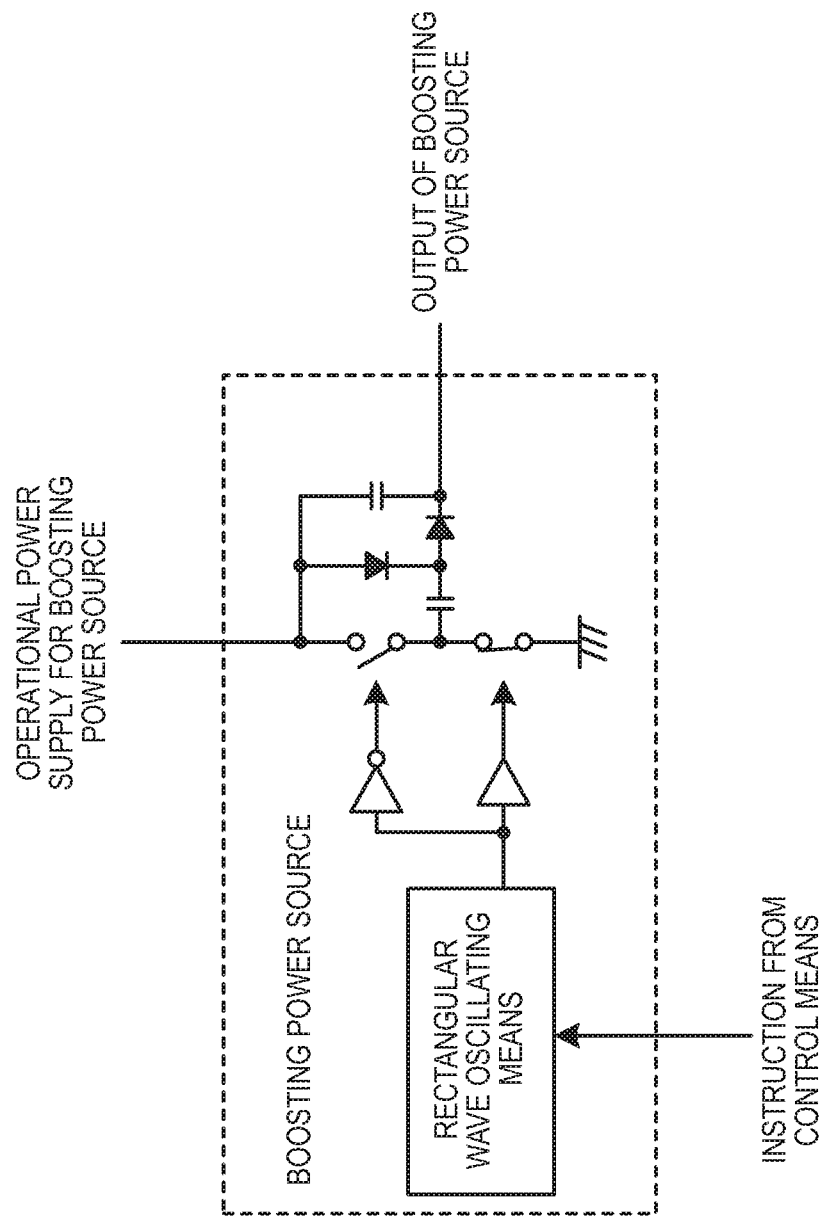
FIG. 5 is a diagram showing a configuration example of a boosting power source for operating the power switch device in accordance with the second embodiment of the invention.

As the boosting power source 17, a charge pump circuit as shown in FIG. 5 can be used, for example. In the configuration example in FIG. 5, output voltage two times higher than input voltage can be obtained, if a voltage loss of diodes and switches is negligible. When the operation of the boosting power source 17 starts, a voltage two times higher than the output of the constant voltage power source 40 (e.g., 5V) can be obtained as the operational power supply for the ramp waveform generating means 20.

Figure 6:
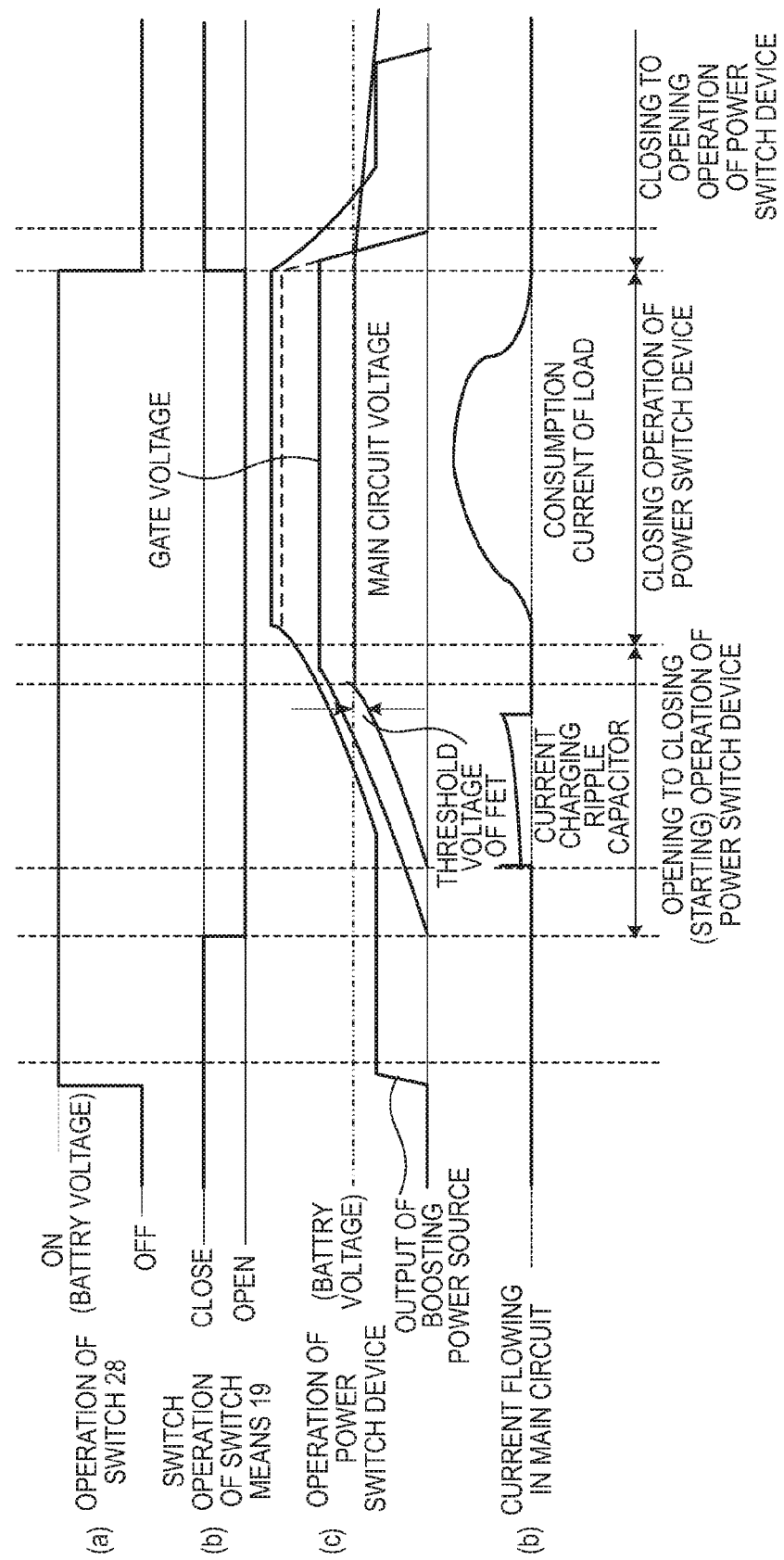
FIG. 6 is a diagram illustrating the operation of the system using the power switch device in accordance with the second embodiment of the invention.

Next, the operation is described. FIG. 6 illustrates the operation of the system 200 using the power switch device 41 in accordance with the second embodiment.

In FIG. 6, (a) shows the operating state of a switch 28; (b) shows the operating state of a switch means 19; (c) shows the operating state of the power switch device 16; and (d) shows the current flowing in the main circuits 12, 13.

In response to the output of the boosting power source 17, in a resistor 44 included in the ramp waveform generating means 20, a current generally depending on the value of the resistor 44 and the output voltage of the boosting power source 17 flows. By opening the switch means 19, a capacitor 45 is charged by a current value flowing in the resistor 44, then, as shown in FIG. 6(c), a voltage Vb appearing at the bottom end of the capacitor 45 gradually increases the gate voltage of the MOSFET 21 through an NPN transistor 46 and a diode 27.

At the drain of the MOSFET 21 (main circuit 13), a voltage offset by a gate threshold voltage appears and charges the ripple capacitor 15. At the same time, the voltage of the main circuit 13 is supplied to the boosting power source 17 as its operational power supply through the diode 43, so, when the voltage of the main circuit 13 becomes higher than the output of the constant voltage power source 40, the main circuit 13 supplies power to the boosting power source 17. As a result, the output voltage of the boosting power source 17 further increases.

As a result, the charging current of the capacitor 45 included in the ramp waveform generating means 20 increases, then the increase rate of the gate drive voltage of the MOSFET 21 increases with time and, similarly, the voltage increase rate of the main circuit 13 increases with time. That is, the charging current of the ripple capacitor 15 increases with time and the switch closes, that is, the trace of the current flowing in the MOSFET 21 is like Lb in FIG. 3, so starting by high-speed charging operation of the ripple capacitor 15 is possible while a sufficient operation margin is ensured within the area of safe operation.

As described above, the power switch device 41 in accordance with the second embodiment and the system 200 using the power switch device 41 are configured such that when the MOSFET 21 for opening and closing power supply transitions power supply from opening to closing, the increase rate of the output voltage of the MOSFET 21 increases with time, so, in addition to the effect of the first embodiment, an effect can be obtained in which high-speed starting can be performed within an allowable range of the transition operation of the MOSFET 21.

Third Embodiment

Next, a power switch device in accordance with a third embodiment of the invention and a system using the power switch device are described.

In the first or second embodiment, the use of a MOSFET as a semiconductor switch means is described. However, the purpose can be achieved as long as power supply transition from opening to closing can be operated by gradually increasing output voltage by means of switch. So, a device to be used is not limited to a MOSFET, but, for example, a bipolar transistor may also be used to achieve the same effect. Next, a configuration example of a system for implementing this embodiment is described.

Figure 7:
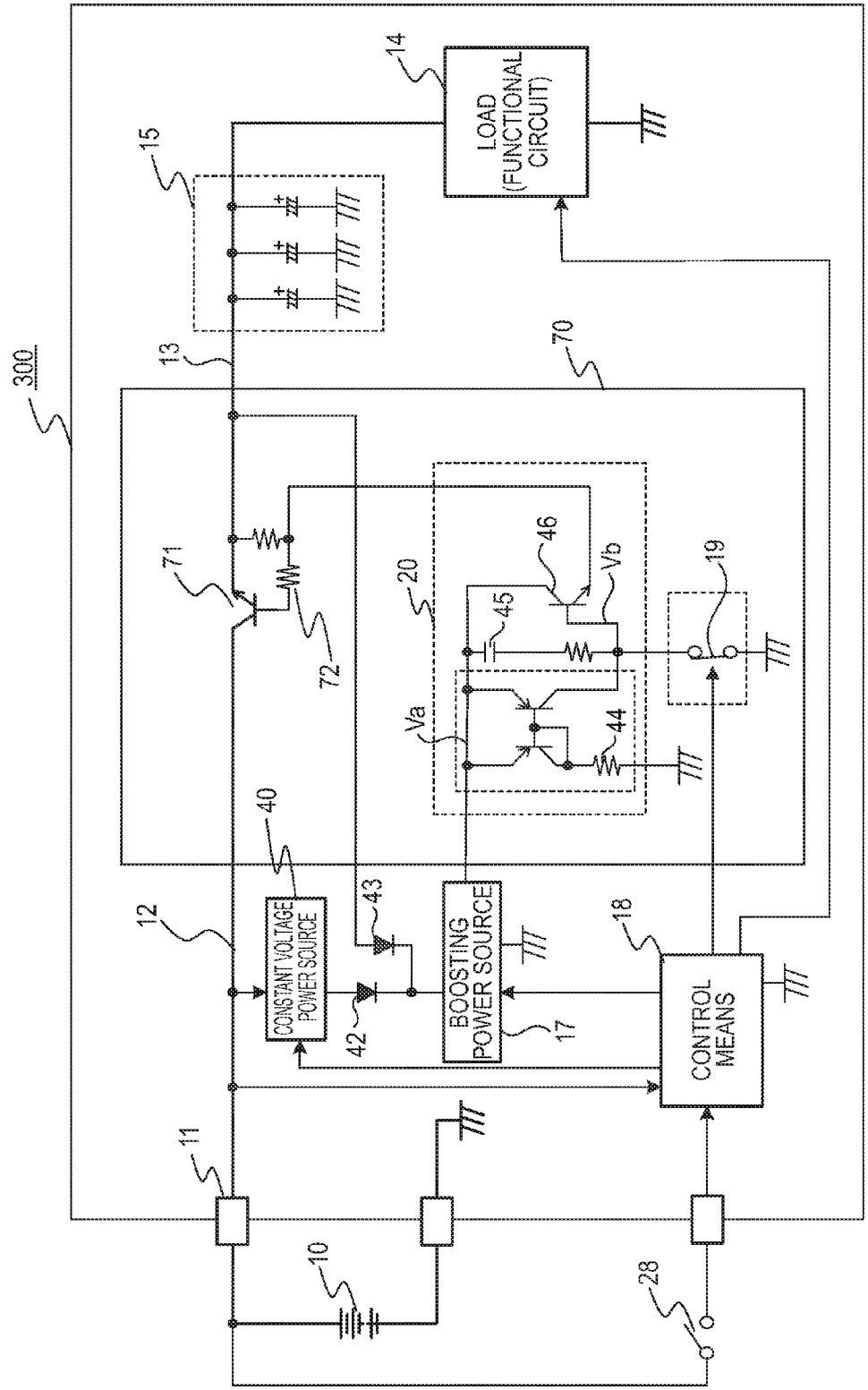
FIG. 7 is a diagram showing a connection example of a system using a power switch device in accordance with a third embodiment of the invention.

FIG. 7 shows a connection example of a system using a power switch device in accordance with the third embodiment.

In the third embodiment shown in FIG. 7, a part that is the same as or corresponding to that of the first or second embodiment is denoted by the same reference numeral and is not described in detail.

In a system 300 using a power switch device 70 in accordance with the third embodiment, the voltage output from a ramp waveform generating means 20 is input to the base of a bipolar transistor 71 as a semiconductor switch means through a base limiting resistor 72. In the bipolar transistor 71, the collector voltage varies depending on the base voltage. The ramp waveform generating means 20 for generating a base drive voltage waveform operates as in the second embodiment. When the power switch device 70 operates to transition power supply from opening to closing, the increase rate of the output voltage of the collector side of the bipolar transistor 71 increases with time, and, similarly, the voltage increase rate of the main circuit 13 increases with time.

That is, the charging current of the ripple capacitor 15 increases with time, and, when the switch closes, starting by high-speed charging operation of the ripple capacitor 15 is possible while a sufficient operation margin is ensured within the area of safe operation, as in the case of using a MOSFET as a switch device in the second embodiment.

Fourth Embodiment

Next, a power switch device in accordance with a fourth embodiment of the invention is described.

In the first, second or third embodiment, the use of a bipolar transistor or a MOSFET as a semiconductor switch means for power switch is described, as an example. Using such a semiconductor switch means, when a normal voltage is applied to the system, the power switch function is normally performed, however, when an abnormal voltage is applied to the system such that the power source is connected in reverse polarity, the switch device may be damaged due to its insufficient withstand voltage or a reverse voltage may wrap around into the system through parasitic elements for structural reasons of the semiconductor, so it is difficult to protect the system.

In order to solve such a problem, a MOSFET for preventing current wraparound when the power source is connected in reverse polarity can be provided adjacent to the semiconductor switch means for power switch. Next, a configuration example of a system for implementing this embodiment is described.

Figure 8A:
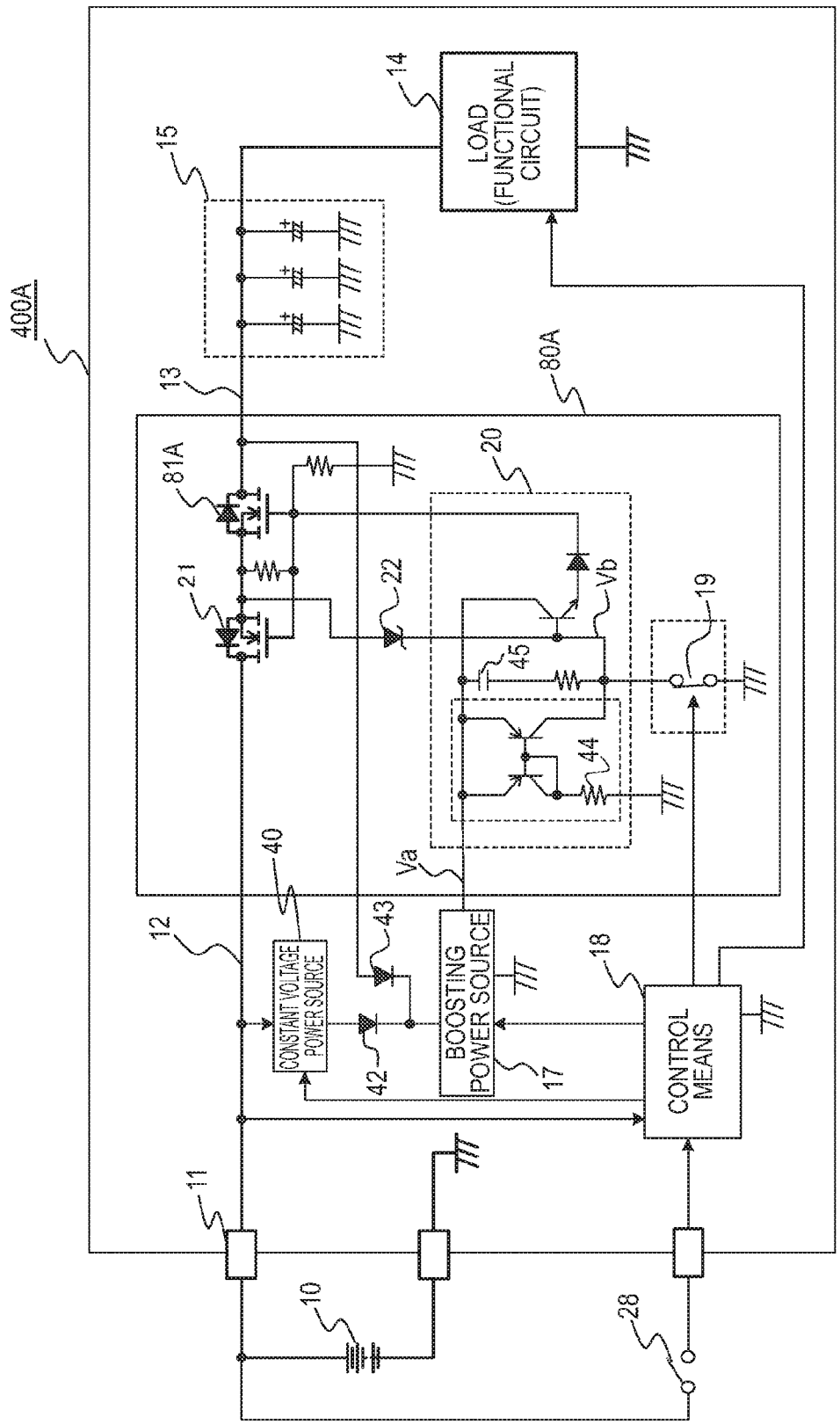
FIG. 8A is a diagram showing a connection example of a system using a power switch device in accordance with a fourth embodiment of the invention.

FIG. 8A shows a connection example of a system using a power switch device in accordance with the fourth embodiment.

In FIG. 8A, a reference numeral 80A denotes a power switch device in accordance with the fourth embodiment and a reference numeral 400A denotes a system that uses the power switch device 80A. In the fourth embodiment, a MOSFET 21 is used as a switch device, and a MOSFET 81A for reverse connection protection against power source reverse connection is adjacent and connected to the MOSFET 21. When the power source is connected in normal polarity, the body diode of the MOSFET 81A for reverse connection protection is connected in the forward direction, so, even if the gate-source voltage is 0V, the body diode is conducting with its forward direction voltage drop. Since the gates of the MOSFET 21 as a switch means and the MOSFET 81A for reverse connection protection are commonly driven, starting of the system depends on the response of the MOSFET 21. After starting, a necessary and sufficient voltage is securely applied between the source and gate of both the MOSFET 21 and the MOSFET 81A for reverse connection protection, so the MOSFET 81A for reverse connection protection also becomes in ON state and conducting. That is, an operation similar to that of the second embodiment is possible.

Next, when the power source is wrongly connected in reverse polarity, the operational power supply for a boosting power source 40 is prevented by diodes 42 and 43 from being supplied to the boosting power source 17, so the gate drive voltage of the MOSFET 21 remains 0V. In addition, the body diode of the MOSFET 81A for reverse connection protection becomes reversely biased, so wraparound of power supply in reverse polarity from the power switch device 80A to the circuit in the system 400A can be prevented.

Note that in the description of the above embodiment, the operation is described, focusing on the behavior of the power switch device 80A with the power source connected in reverse polarity, however, it should be appreciated that, for a constant voltage power source 40, a control means 18, in order to secure withstanding capability against power source reverse polarity connection, appropriate measures, such as an additional protection diode, should be taken on various functional blocks to secure withstanding capability against power source reverse polarity connection for the whole system.

Figure 8B:
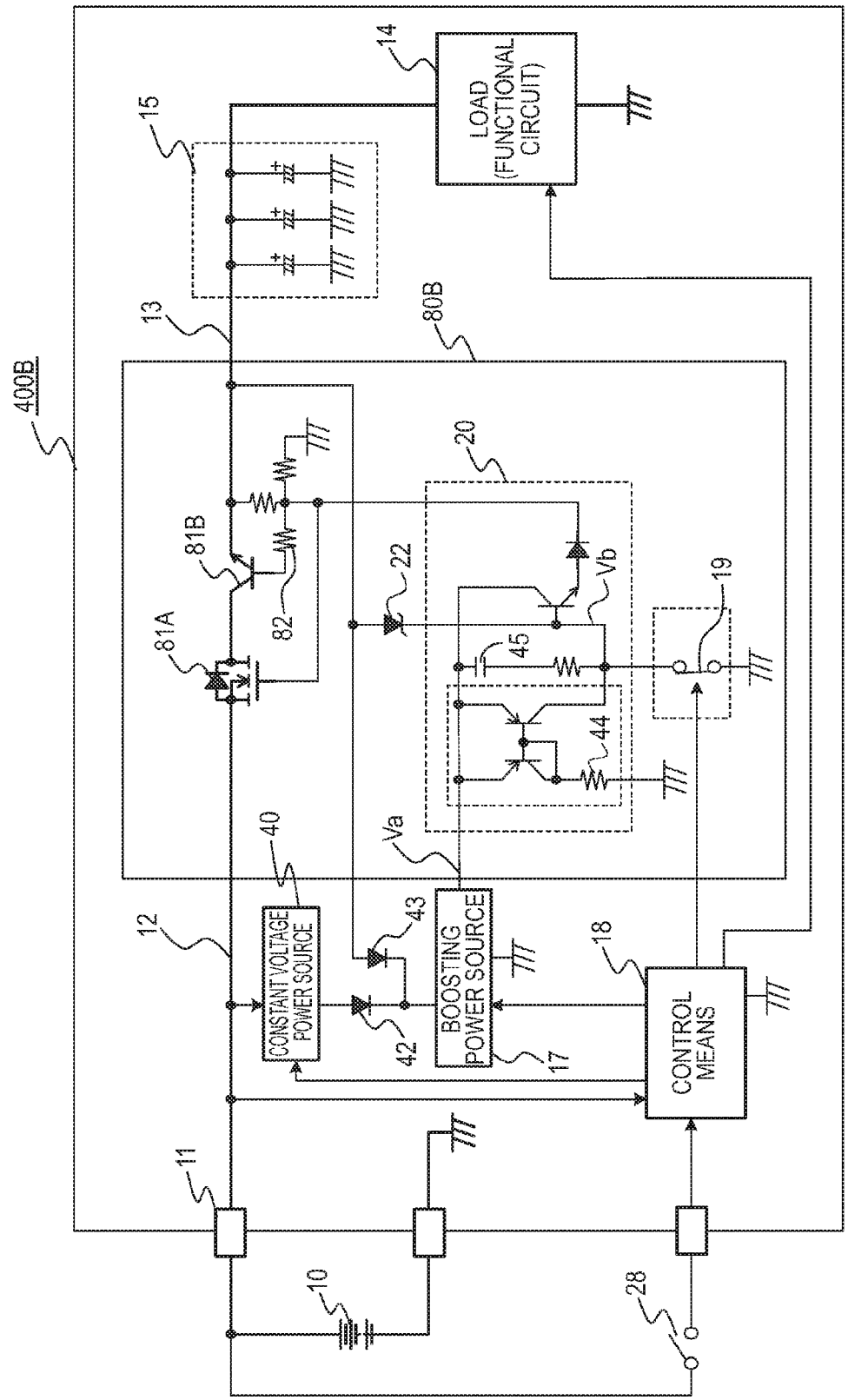
FIG. 8B is a diagram showing a connection example of a system using another embodiment of the power switch device in accordance with the fourth embodiment of the invention.

FIG. 8B shows a variation of the fourth embodiment. In FIG. 8B, a reference numeral 80B denotes a power switch device and a reference numeral 400B denotes a system using the power switch device 80B. In the embodiment shown in FIG. 8B, a bipolar transistor 81B is used as a switch device as a configuration example.

The base of the bipolar transistor 81B and the gate of the MOSFET 81A for reverse connection protection are driven by the same drive signal by using a base-drive series resistor 82, which provides operation similar to that of FIG. 8A. The remaining configuration and operation is similar to that of FIG. 8A and is not described.

As described above, the power switch devices 80A and 80B in accordance with the fourth embodiment can be provided in a simple configuration using the MOSFET 21 or bipolar transistor 81B that is generally easily available, as a semiconductor switch means, which is a switch means of the power switch device.

Furthermore, the MOSFET 81A for reverse connection protection that prevents current wraparound when the power source is connected in reverse polarity is provided adjacent to the MOSFET 21 or bipolar transistor 81B for opening and closing power supply, so, even when the power source is wrongly connected in reverse polarity, current wraparound to the load 14 can be prevented, and the protective characteristic against power source reverse connection functionally equivalent to a mechanical relay can also be achieved.

Fifth Embodiment

Figure 9:
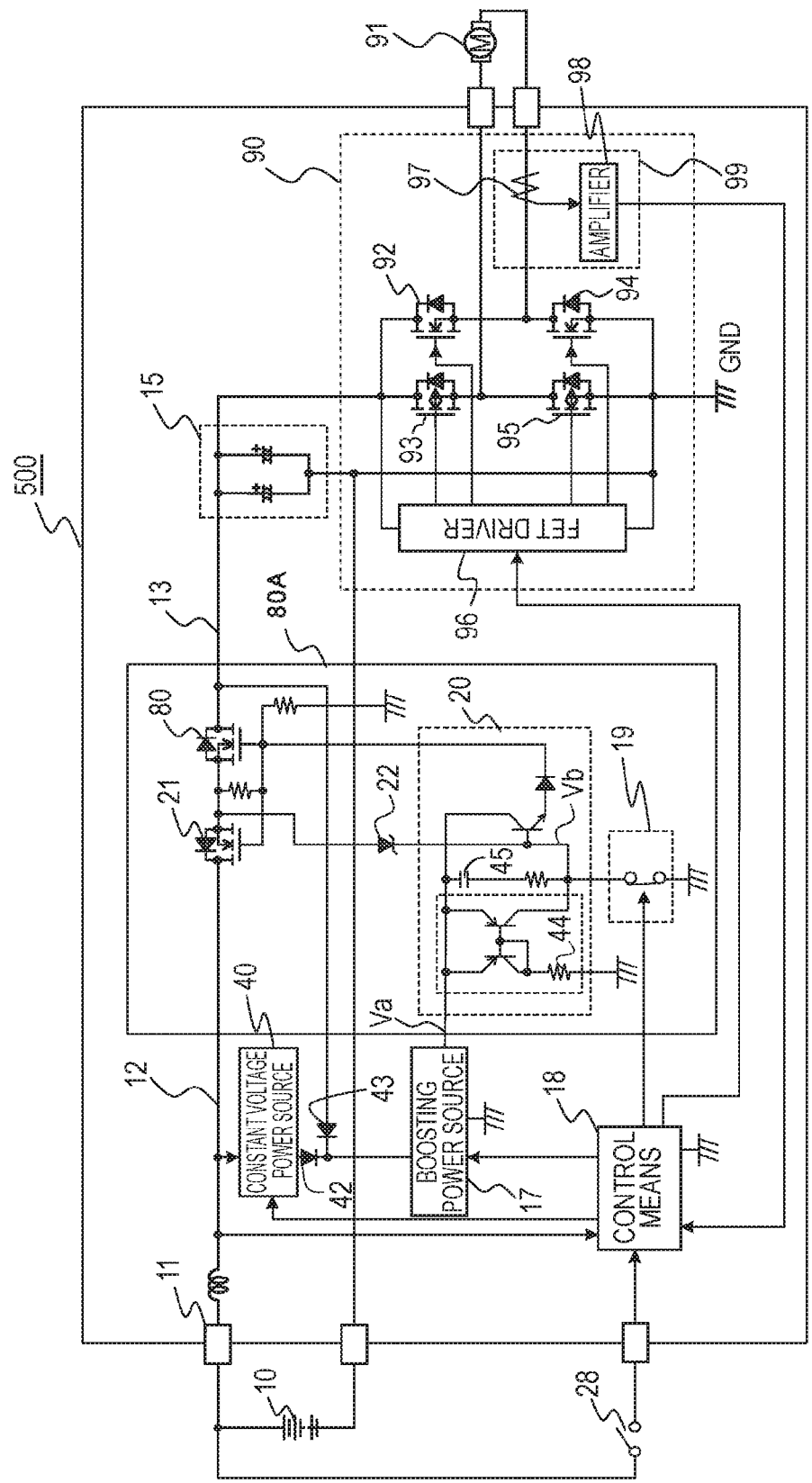
FIG. 9 is a diagram showing a connection example of a system using a power switch device in accordance with a fifth embodiment of the invention.

Next, a power switch device in accordance with a fifth embodiment of the invention and a system using the power switch device are described. FIG. 9 illustrates the operation of a system using a power switch device in accordance with the fifth embodiment. In the fifth embodiment, as a load that operates by direct current power supply, a motor drive circuit using a PWM inverter circuit is connected.

In FIG. 9, a reference numeral 90 denotes a PWM inverter circuit and the PWM inverter circuit 90 is what is called an H-bridge type inverter, in which the output between two terminals of the inverter output causes the rotation direction and the amount of energization current of a DC motor 91 to vary. Accordingly, for example, with a permanent magnet field type brushed winding DC motor as an applicable motor, the output torque can be controlled depending on the current value energizing the DC motor 91. Note that a system in accordance with the fifth embodiment is denoted by a reference numeral 500.

Considering this characteristic, one example of specific application may be an electrically-driven power steering apparatus and the like in which, in order to reduce the steering effort of a driver in a car steering system, an assist torque to be added to the steering system is appropriately controlled by controlling motor energizing current depending on a torque detected by a torque sensor for detecting the steering effort to contribute to improvement of drivability.

By the way, in the configuration of FIG. 9, the load 14 of FIG. 8A in the fourth embodiment is configured to be the PWM inverter circuit 90, and the power switch device 80A performs start operation as described in the fourth embodiment and starts power supply to the PWM inverter circuit 90 as a load.

After power supply is started, a control means 18 provides an appropriate PWM duty with a frequency higher than the upper limit of audible frequency selected depending on the direction and amount of current to energize the DC motor 91, between the gate and source of FETs 92, 93, 94 and 95 included in the PWM inverter circuit 90, through an FET driver means 96. As a result, the motor drive current having actually flowed is fed back to the control means 18 using a current detection means 99 including a current detector 97 and an amplifier 98 to achieve driving the DC motor 91 with a desired energizing current and energization direction.

Here, consider the current flowing in the PWM inverter circuit 90. In PWM powering, that is, when current flows from the power source to the DC motor 91, in the PWM pattern P in FIG. 10A, the current flows to turn on the FET 92, then turn on the DC motor 91, then turn on the FET 95 and then to return to GND. At this time, in order to follow rapid variation in the power supply current at the switching transition, a current is instantaneously supplied from the ripple capacitor 15.

Figure 10B:
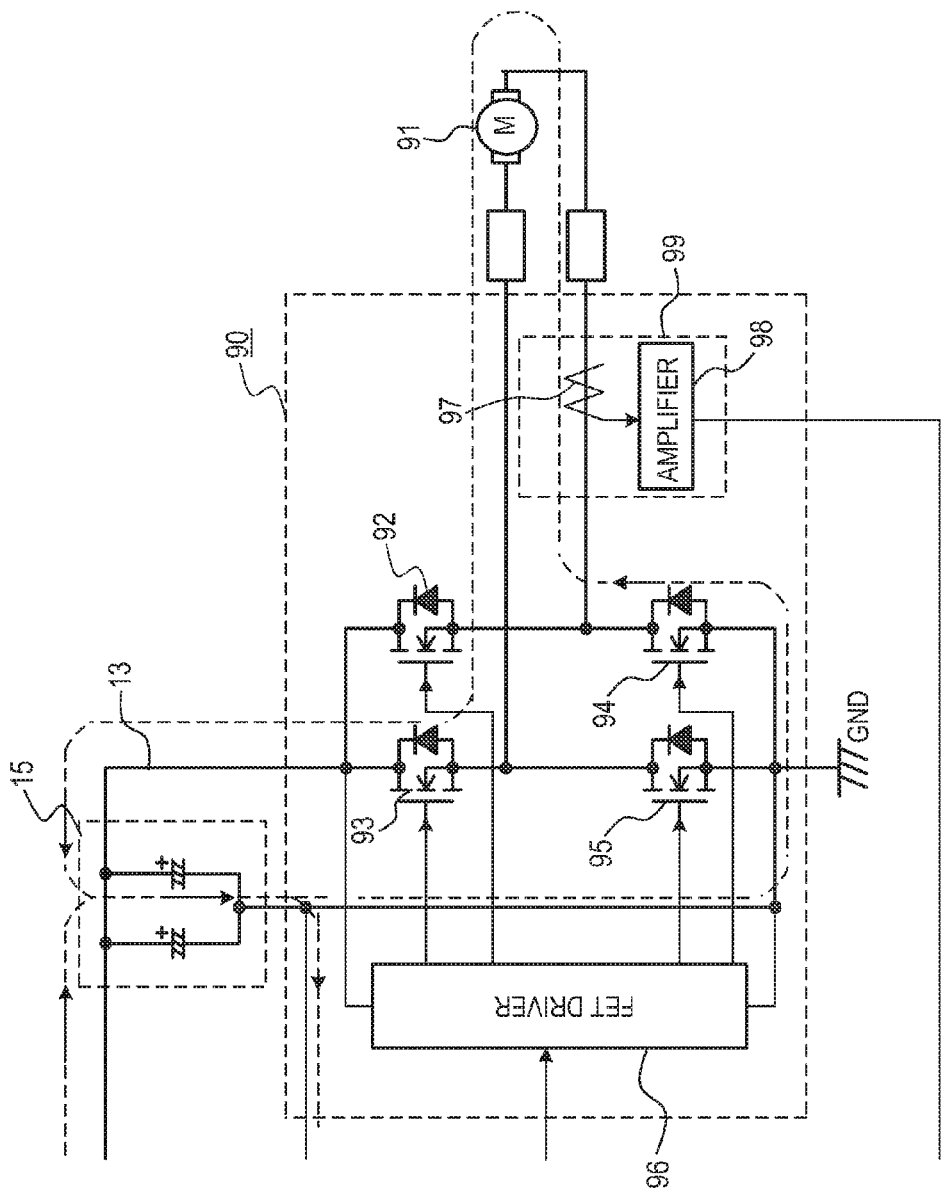
FIG. 10B is a diagram illustrating the operation of the system using the power switch device in accordance with the fifth embodiment of the invention.

Next, in FIG. 10B, considering the case in which the PWM duty is on OFF timing and the motor drive current continues in regeneration state, the FETs 92 and 95 that have been ON in FIG. 10A turn OFF, and on the contrary, the FETs 93, 94 turn ON, then as result, current flows from GND through the FET 94, then the DC motor 91, then the FET 93 and then to the power source with the direction kept constant by an inductance component of the DC motor 91, resulting in the current flowing back to the main circuit 13.

For pulsation of this current, the ripple capacitor 15 absorbs fluctuation component. In general, a relatively large capacitance is used for the ripple capacitor 15 in order to minimize fluctuations in the power supply current. Thus, as in this embodiment, the power switch device 80A has the function of minimizing inrush current to provide a great effect of mitigating the amount of inrush current when power is turned on.

For the ripple capacitor 15, since large capacitance is needed, generally, a polar device, such as an aluminum electrolytic capacitor, is often used. In addition, an inverter arm of the pair of the FETs 92, 93 or FETs 94, 95 included in the PWM inverter circuit 90 will be in short circuit condition when inversely biased due to existence of parasitic diode of FET, so the protection provided by the power switch device 80A against power source reverse connection may be an effective means for preventing the PWM inverter circuit 90 from being damaged.

Note that this embodiment is described with respect to a simple H-bridge configuration for the PWM inverter circuit 90, however, the configuration of the PWM inverter circuit 90 is not limited to this. Needless to say, for example, also for a triphase bridge inverter or further multiphase bridge circuit, the power switch device 80A can be effectively applied to a problem similar to the embodiment, such as a measure against ripple current due to switching, need for protection against reverse connection and the like.

The power switch device in accordance with the first to fifth embodiments and the system using the power switch device have been described. However, the embodiments of the invention may be freely combined or appropriately modified or omitted within the scope of the invention.

What is claimed is:

1. A power switch device for providing and cutting off power supply to a functional circuit, the power switch device being provided between power supply lines and a direct current (DC) power source, the power supply lines including a capacitor for stabilizing a supply voltage against fluctuations in a current in the functional circuit, powered by the DC power source, the power switch device comprising:
   a semiconductor switch which causes the DC power source to be connected and disconnected, and is connected between the power supply lines and the DC power source; and
   a ramp waveform generating circuit which is connected in series to the semiconductor switch and provides, to the semiconductor switch, an input voltage rising as a ramp function, to gradually increase an output voltage of the semiconductor switch during a transition from an open state to a closed state, to minimize a value of the current charging the capacitor.

2. The power switch device according to claim 1, wherein, for an operation of the power switch device for transitioning power supply from opening to closing, the increase rate of the output voltage of the semiconductor switch is configured to increase with time.

3. The power switch device according to claim 1, wherein the semiconductor switch is configured using a bipolar transistor or a MOSFET.

4. The power switch device according to claim 3, wherein a protection MOSFET for preventing current wraparound due to reverse connection of the DC power source is provided adjacent to the semiconductor switch.

5. The power switch device according to claim 1, wherein the functional circuit is a PWM inverter circuit for driving a motor.

6. A system comprising:
   the power switch device according to claim 1; and
   the functional circuit powered by a voltage supplied from the DC power source through the power switch device.

* * * * *